US012383087B2

(12) United States Patent
Ramos

(10) Patent No.: US 12,383,087 B2

(45) Date of Patent: Aug. 12, 2025

(54) SUPPORT APPARATUS FOR A CURTAIN ROD

(71) Applicant: Deborah Ramos, San Antonio, TX (US)

(72) Inventor: Deborah Ramos, San Antonio, TX (US)

(*) Notice: Subject to any disclaimer, the term of this patent is extended or adjusted under 35 U.S.C. 154(b) by 369 days.

(21) Appl. No.: 18/090,613

(22) Filed: Dec. 29, 2022

(65) Prior Publication Data

US 2024/0215747 A1 Jul. 4, 2024

(51) Int. Cl.

*A47H 7/00* (2006.01)
*B25H 1/00* (2006.01)

(52) U.S. Cl.

CPC ............. *A47H 7/00* (2013.01); *B25H 1/0035* (2013.01); *B25H 1/0042* (2013.01)

(58) Field of Classification Search

CPC ....... A47H 7/00; B25H 1/0035; B25H 1/0042
See application file for complete search history.

(56) References Cited

U.S. PATENT DOCUMENTS

| | | | | |
|---|---|---|---|---|
| 1,576,629 | A | 3/1926 | Culp | |
| 1,888,756 | A | 11/1932 | Brownstein | |
| 2,084,661 | A | 6/1937 | Wagstaff | |
| 2,239,382 | A | 4/1941 | Decker | |
| 2,605,583 | A | 8/1952 | Owens | |
| 5,951,406 | A * | 9/1999 | Steane | A63G 11/00 472/111 |
| 8,444,498 | B2 * | 5/2013 | Grossman | A63G 11/00 472/106 |
| 10,514,291 | B2 * | 12/2019 | Hammond, Jr. | G09B 25/00 |

FOREIGN PATENT DOCUMENTS

| | | |
|---|---|---|
| GB | 13843 | 11/1908 |

* cited by examiner

*Primary Examiner* — Lee D Wilson

(57) ABSTRACT

A support apparatus for supporting a curtain rod in a horizontal orientation during installation of the curtain rod includes a post with a top end and a bottom end which is extendable and retractable. Each one of a pair of extension arms is coupled to the post adjacent to the top end and extends outwardly from the post in one of a pair of opposing directions. Each one of a pair of saddles is coupled to a distal end of an associated extension arm with respect to the post. Each saddle comprises a central member that is coupled to and extends upwardly from the associated extension arm. An upper surface of the central member extends transversely with respect to the extension arm and is configured for supporting the bar, with the pair of saddles being configured for jointly supporting the bar in a horizontal orientation.

18 Claims, 5 Drawing Sheets

SUPPORT APPARATUS FOR A CURTAIN ROD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to support apparatuses and more particularly pertains to a new support apparatus for supporting a curtain rod in a horizontal orientation during installation of the curtain rod.

(2) Description of Related Art Including Information Disclosed Under 37 CFR 1.97 and 1.98

The prior art relates to support apparatuses including one device disclosed by United Kingdom patent GB 13,843 which comprises a telescopic post mounted on a fixed tripod with a pair of pivotally mounted arms which extend outwardly from the post for supporting a curtain rod. As disclosed in the patent, the device is intended to be lifted by a user to place the curtain rod on mounting hooks above a window.

BRIEF SUMMARY OF THE INVENTION

An embodiment of the disclosure meets the needs presented above by generally comprising a post with a top end and a bottom end which is extendable between a retracted position and an extended position. Each one of a pair of extension arms is coupled to the post adjacent to the top end and extends outwardly from the post in one of a pair of opposing directions. Each one of a pair of saddles is coupled to a distal end of an associated extension arm with respect to the post. Each saddle comprises a central member that is coupled to and extends upwardly from the associated extension arm. An upper surface of the central member extends transversely with respect to the extension arm and is configured for supporting the bar, with the pair of saddles being configured for jointly supporting the bar in a horizontal orientation.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
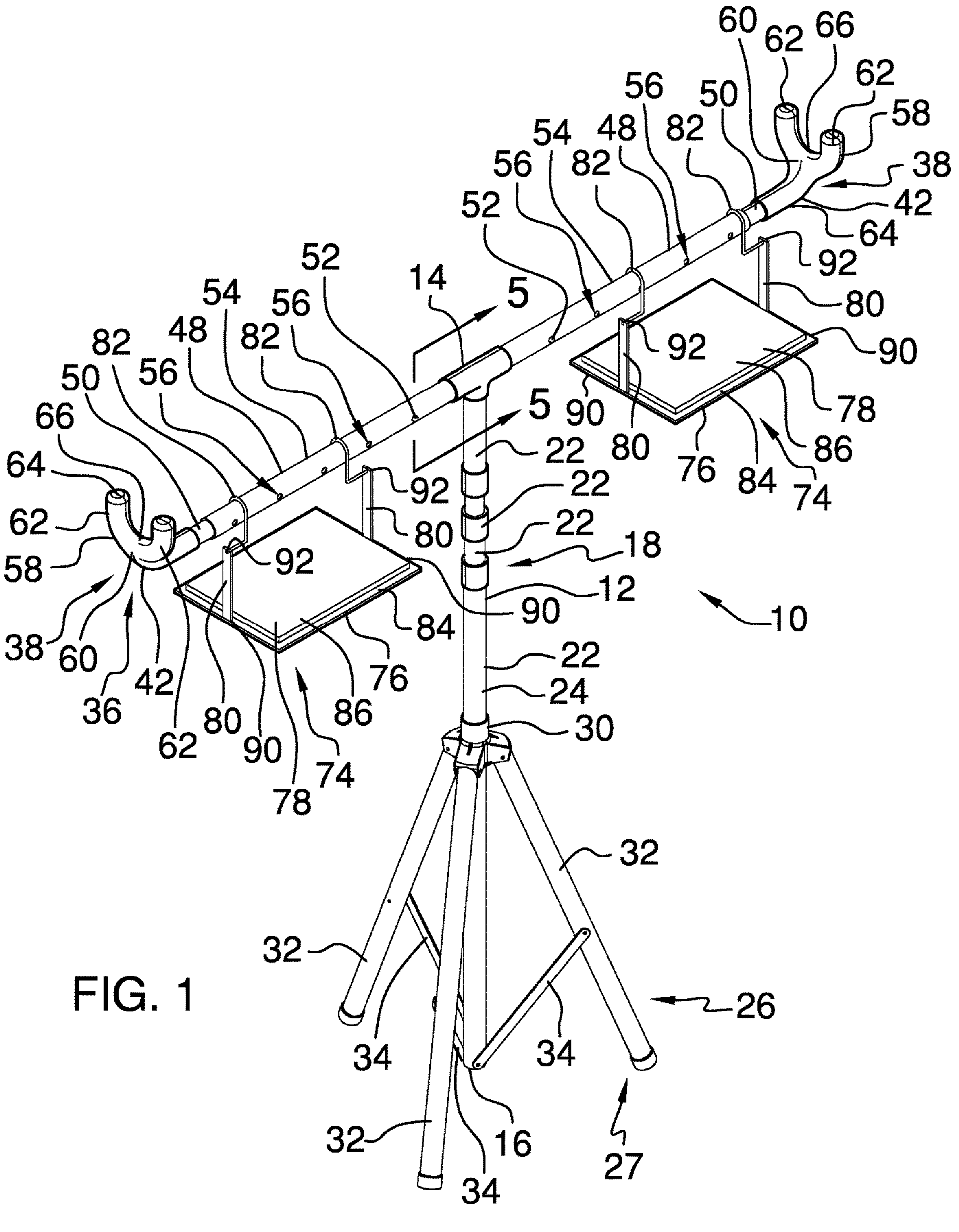
FIG. 1 is a top front side perspective view of a support apparatus according to an embodiment of the disclosure.
Figure 2:
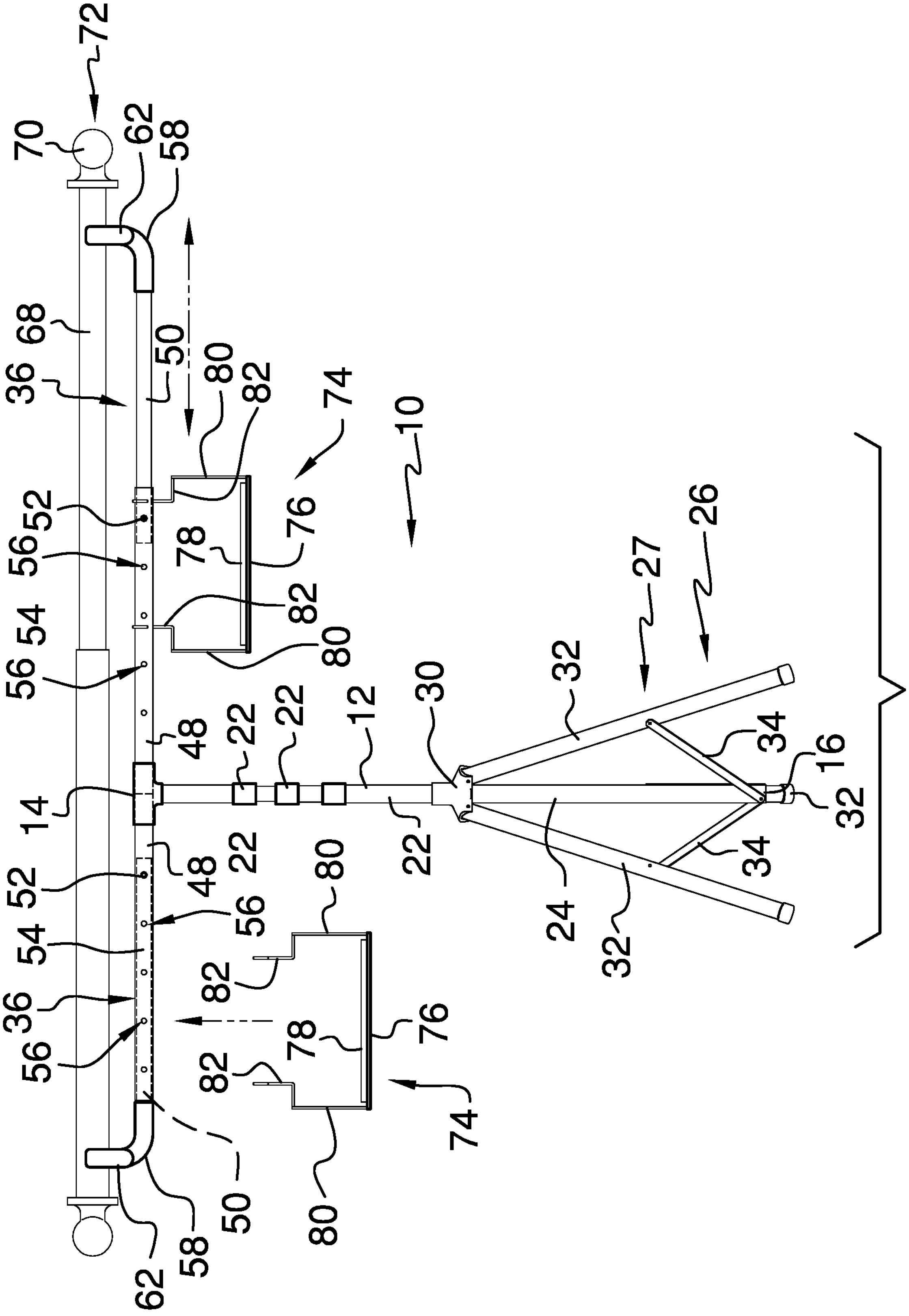
FIG. 2 is a front in-use view of an embodiment of the disclosure.
Figure 3:
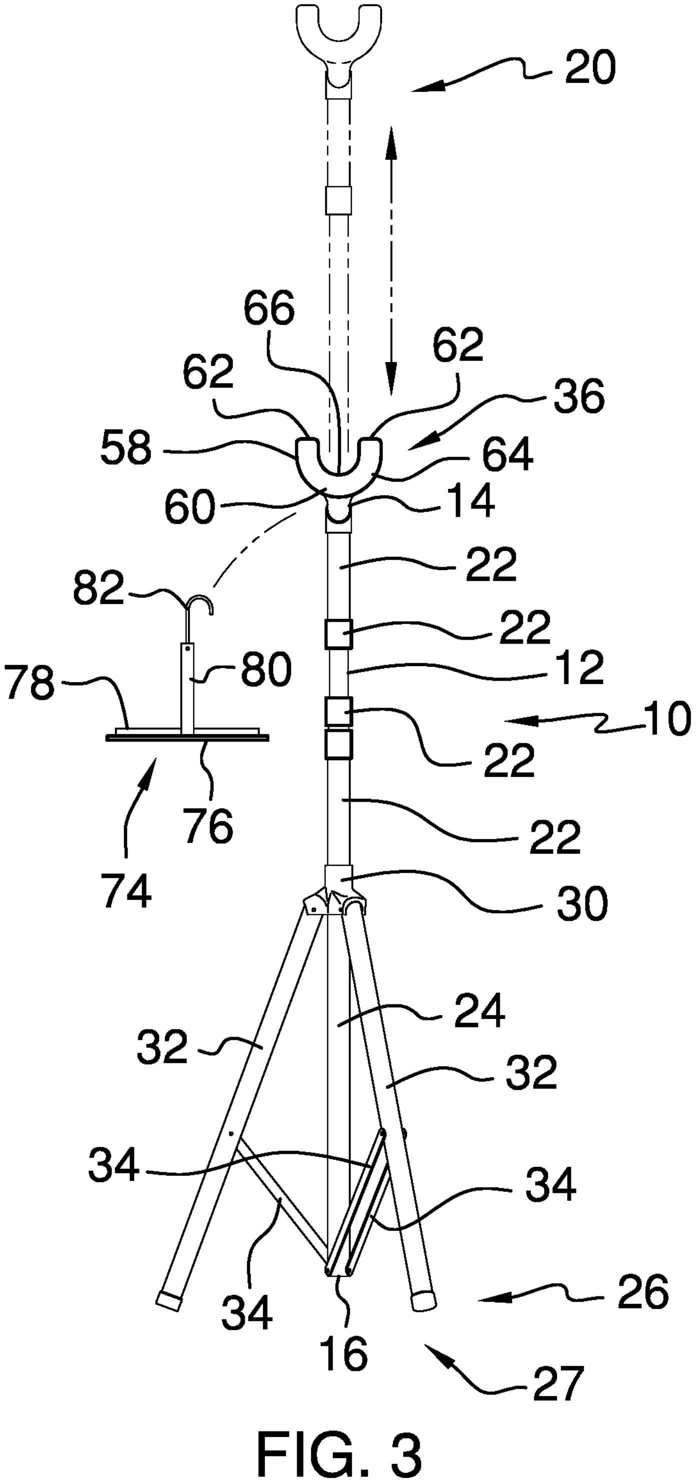
FIG. 3 is a side view of an embodiment of the disclosure.
Figure 4:
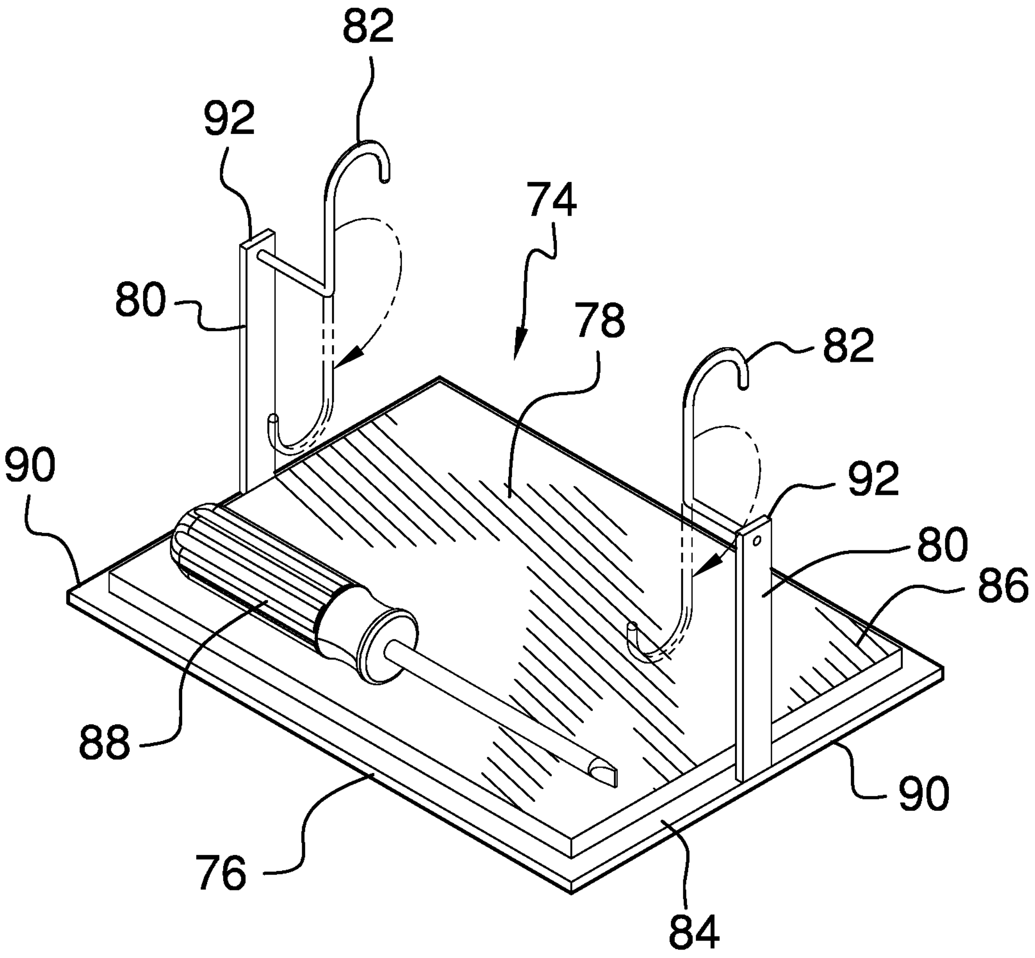
FIG. 4 is a detail in-use view of a tool tray according to an embodiment of the disclosure.
Figure 5:
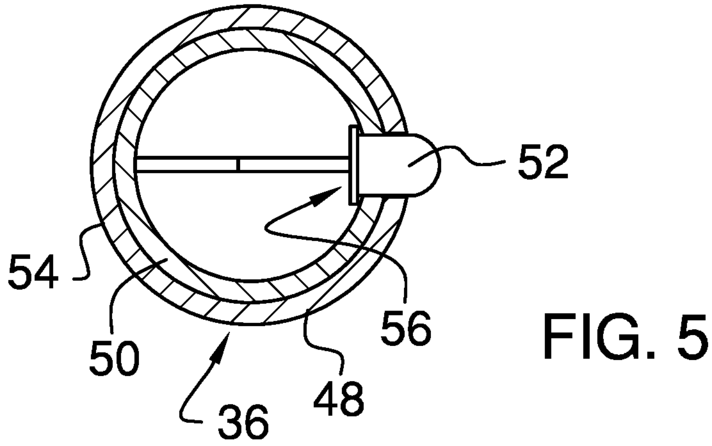
FIG. 5 is a detail cross-sectional view of an extension arm according to an embodiment of the disclosure from the direction of Arrows 5-5 in FIG. 1.
Figure 6:
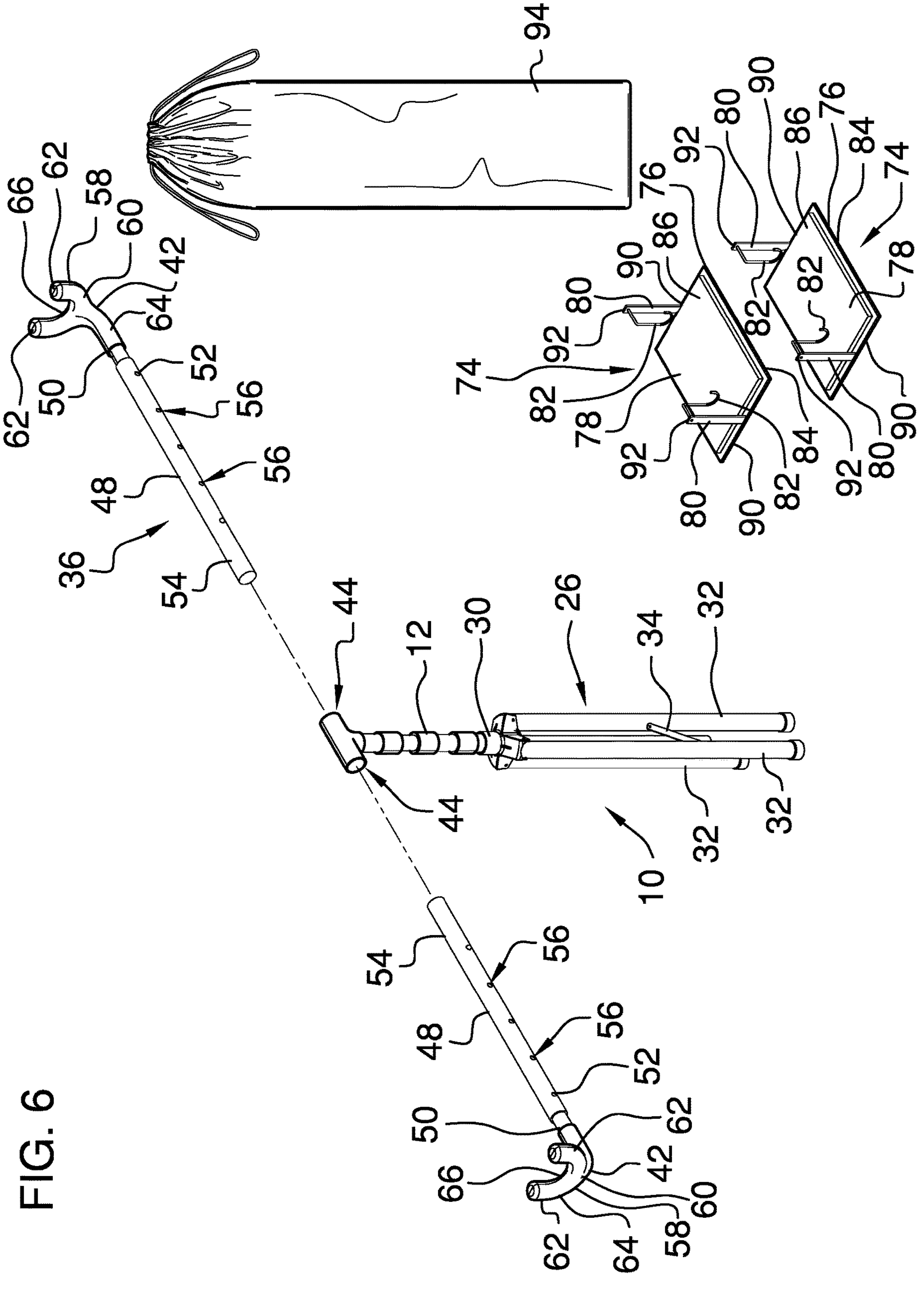
FIG. 6 is an exploded view of an embodiment of the disclosure.

With reference now to the drawings, and in particular to FIGS. 1 through 6 thereof, a new support apparatus embodying the principles and concepts of an embodiment of the disclosure and generally designated by the reference numeral 10 will be described.

As best illustrated in FIGS. 1 through 6, the support apparatus 10 generally comprises a post 12 has a top end 14 and a bottom end 16, and the post 12 is extendable between a retracted position 18 and an extended position 20. The post 12 has a height between the top end 14 and the bottom end 16 that is less than 3.5 feet when the post 12 is positioned in the retracted position 18, and the height is greater than 7.5 feet when the post 12 is positioned in the extended position 20. The post 12 comprises a plurality of rods 22. Each rod 22 except for a bottommost rod 24 of the plurality of rods 22 is telescopically received into an adjacently lower rod 22 of the plurality of rods 22. Each rod 22 except for the bottommost rod 24 is frictionally retained by the adjacently lower rod 22 with respect to the adjacently lower rod 22, but the rods 22 may alternatively be secured by a clamp, set screw, spring-biased pin, or the like.

A collapsible base 26 is coupled to the bottom end 16 of the post 12 for supporting the post 12 on a support surface 28. The collapsible base 26 is positioned in a deployed position 27 such that the collapsible base 26 extends outwardly from the post 12. The collapsible base 26 is collapsible toward the post 12. The collapsible base 26 comprises a slider 30, a plurality of legs 32, and a plurality of links 34.

The slider 30 is slidably coupled to and surrounds the post 12. Each leg 32 is pivotally coupled to the slider 30 such that each leg 32 is pivotable toward and away from the post 12. Each leg 32 extends outwardly from the post 12 and is angled downwardly. Each link 34 is pivotally coupled to the post 12 adjacent to the bottom end 16 and to one of the plurality of legs 32 such that each leg 32 pivots outwardly away from the post 12 when the slider 30 moves toward the bottom end 16 and toward the post 12 when the slider 30 moves away from the bottom end 16.

Each one of a pair of extension arms 36 is coupled to the post 12 adjacent to the top end 14. Each extension arm 36 extends outwardly away from the post 12 in one of a pair of opposing directions. The extension arms 36 are extendable away from and retractable toward the post 12 and are positionable in a shortened position 38 and a lengthened position 40. When the arms are in the shortened position 38, an arm span distance between a distal end 42 of one extension arm 36 with respect to the post 12 and a distal end 42 of another extension arm 36 with respect to the post 12 is less than 3.5 feet. In the lengthened position 40, the arm span distance is greater than 7.5 feet. Each extension arm 36 is also detachable from the post 12. The post 12 has a pair of opposed recesses 44, each of which receives one of the extension arms 36.

Each extension arm 36 comprises a first arm segment 48 that is coupled to the post 12 and a second arm segment 50 which is telescopically engaged to the first arm segment 48. Each extension arm 36 also comprises a securement pin 52 which is coupled to the second arm segment 50 of an associated one of the pair of extension arms 36. The first arm segment 36 of each extension arm 36 has an outer wall 54 and a plurality of securement holes 56 extending through the outer wall 54. The plurality of securement holes 56 is arranged along a line extending away from the post 12 toward the distal end 42 of the associated extension arm 36. The securement pin 52 is spring-biased to insert through one of the plurality of securement holes 56 of the associated extension arm 36, thereby restraining axial movement of the second arm segment 50 with respect to the first arm segment 48.

Each one of a pair of saddles 58 is coupled to the distal end 42 of an associated extension arm 36 of the pair of extension arms 36. Each saddle 58 comprises a central member 60, a pair of prongs 62, and a coating 64. The central member 60 of each said saddle 58 is coupled to and extends upwardly from the associated extension arm 36. An upper surface 66 of the central member 60 extends transversely with respect to the associated extension arm 36 and is concavely arcuate. The upper surface 66 is configured for supporting a bar 68. The bar 68 may be any elongated object including, for example, a curtain rod 70. Each prong 62 is coupled to and extends upwardly from the central member 60 of an associated saddle 58 with the central member 60 extending between each prong 62. The coating 64 is slip resistant and covers the central member 60 and each prong 62 of the associated saddle 58. The pair of saddles 58 is configured for jointly supporting the bar 68 in a horizontal orientation 72.

A pair of tool trays 74 is coupled to and extends downwardly from an associated one of the extension arms 36. Each tool tray 74 comprises a panel 76, a platform 78, a pair of strips 80, and a pair of hooks 82. The platform 78 of an associated one of the pair of tool trays 74 is coupled to a top side 84 of the panel 76 of the associated tool tray 74 and has a top surface 86 which is slip resistant. The top surface 86 is configured for supporting a tool 88 and frictionally engaging the tool 88 to retain the tool 88 on the top surface 86. Each strip 80 is coupled to one of a pair of opposing edges 90 of the panel 76 of the associated tool tray 74 and extends upwardly from the panel 76 toward the associated extension arm 36. Each hook 82 is coupled to an upper end 92 of an associated one of the pair of strips 80 of the associated tool tray 74. Each hook 82 extends upwardly and around the associated extension arm 36, thereby removably hanging the associated tool tray 74 to the associated extension arm 36. Each hook 82 is rotatable with respect to the associated strip 80 such that each hook 82 is positionable to extend downwardly from the upper end 92 of the associated strip 80.

In use, the collapsible base 26 is positioned in the deployed position 27 and placed on the support surface 28. The post 12 is extended or retracted to position the extension arms 36 at a height chosen by a user. The extension arms 36 are also extended or retracted to position the saddles 58 at positions chosen by the user. Then the bar 68 is positioned on the pair of saddles 58. In this manner, the apparatus 10 may aid in the positioning of the bar 68 near a wall for attachment of the bar 68 to the wall. If the bar 68 is a curtain rod 70 for example, the apparatus 10 aids the installation of the curtain rod 70. The tool is placed on the tool tray 74 as needed by the user. The collapsible base 26, the post 12, the extension arms 36, and the tool trays 74 may be stored, for example, in a storage bag 94 when not being used.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A support apparatus for holding a bar, the support apparatus comprising:

a post having a top end and a bottom end, said post being extendable between a retracted position and an extended position;

a pair of extension arms, each said extension arm being coupled to said post adjacent to said top end, each said extension arm extending outwardly from said post in one of a pair of opposing directions;

a pair of saddles, each said saddle being coupled to a distal end of an associated extension arm with respect to said post, each said saddle comprising a central member being coupled to and extending upwardly from said associated extension arm, an upper surface of said central member extending transversely with respect to said extension arm, said upper surface being configured for supporting the bar, said pair of saddles being configured for jointly supporting the bar in a horizontal orientation; and a pair of prongs, each said prong being coupled to and extending upwardly from said central member of an associated one of said pair of saddles, said central member extending between each prong said associated saddle.

2. The apparatus of claim 1, wherein said post has a height between said top end and said bottom end being less than 3.5 feet when said post is positioned in said retracted position, said height being greater than 7.5 feet when said post is positioned in said extended position.

3. The apparatus of claim 1, wherein said post comprises a plurality of rods, each said rod except for a bottommost rod of said plurality of rods being telescopically received into an adjacently lower rod of said plurality of rods.

4. The apparatus of claim 3, wherein each said rod except for said bottommost rod is frictionally retained by said adjacently lower rod with respect to said adjacently lower rod.

5. The apparatus of claim 1, further comprising a collapsible base being coupled to said bottom end of said post for supporting said post on a support surface, said collapsible base being positioned in a deployed position wherein said collapsible base extends outwardly from said post, said collapsible base being collapsible toward said post.

6. A support apparatus for holding a bar, the support apparatus comprising:

a post having a top end and a bottom end, said post being extendable between a retracted position and an extended position;

a pair of extension arms, each said extension arm being coupled to said post adjacent to said top end, each said extension arm extending outwardly from said post in one of a pair of opposing directions;

a pair of saddles, each said saddle being coupled to a distal end of an associated extension arm with respect to said post, each said saddle comprising a central member being coupled to and extending upwardly from said associated extension arm, an upper surface of said central member extending transversely with respect to said extension arm, said upper surface being configured for supporting the bar, said pair of saddles being configured for jointly supporting the bar in a horizontal orientation;

a collapsible base being coupled to said bottom end of said post for supporting said post on a support surface, said collapsible base being positioned in a deployed position wherein said collapsible base extends outwardly from said post, said collapsible base being collapsible toward said post; and wherein said collapsible base comprises a slider being slidably coupled to said post, said slider laterally surrounding said post, a plurality of legs, each said leg being pivotally coupled to said slider such that each said leg is pivotable toward and away from said post, each said leg extending outwardly from said post and being angled downwardly, and a plurality of links, each said link being pivotally coupled to said post adjacent to said bottom end and to one of said plurality of legs, wherein each said leg pivots outwardly from said post when said slider moves toward said bottom end and toward said post when said slider moves away from said bottom end.

7. The apparatus of claim 1, wherein each said extension arm being extendable away from and retractable toward said post.

8. The apparatus of claim 7, wherein said pair of extension arms is positionable in a shortened position wherein an arm span distance between a distal end of one extension arm with respect to said post and a distal end of another extension arm with respect to said post is less than 3.5 feet, said pair of extension arms being positionable in a lengthened position wherein said arm span distance is greater than 7.5 feet.

9. The apparatus of claim 7, wherein each said extension arm is detachable from said post.

10. The apparatus of claim 9, wherein said post has a pair of opposed recesses, each said opposed recess receiving one of said extension arms.

11. The apparatus of claim 7, wherein each said extension arm comprises:

a first arm segment being coupled to said post; and a second arm segment extending telescopically into said first arm segment.

12. The apparatus of claim 11, wherein each said extension arm further comprises a securement pin being coupled to said second arm segment, said first arm segment having an outer wall and a plurality of securement holes extending through said outer wall, said plurality of securement holes being arranged along a line extending away from said post toward said distal end of said extension arm, said securement pin being spring-biased to insert through one of said plurality of securement holes, thereby restraining axial movement of said second arm segment with respect to said first arm segment.

13. The apparatus of claim 1, wherein said upper surface of said central member of each said saddle is concavely arcuate.

14. The apparatus of claim 1, wherein each saddle further comprises a coating covering said central member and each said prong of said associated saddle, said coating being slip resistant.

15. A support apparatus for holding a bar, the support apparatus comprising:

a post having a top end and a bottom end, said post being extendable between a retracted position and an extended position;

a pair of extension arms, each said extension arm being coupled to said post adjacent to said top end, each said extension arm extending outwardly from said post in one of a pair of opposing directions;

a pair of saddles, each said saddle being coupled to a distal end of an associated extension arm with respect to said post, each said saddle comprising a central member being coupled to and extending upwardly from said associated extension arm, an upper surface of said central member extending transversely with respect to said extension arm, said upper surface being configured for supporting the bar, said pair of saddles being configured for jointly supporting the bar in a horizontal orientation; and a pair of tool trays being coupled to and extending downwardly from an associated one of said extension arms, each said tool tray comprising a panel, and a platform being coupled to a top side of said panel, said platform having a top surface being slip resistant, said top surface being configured for supporting a tool and frictionally engaging the tool to retain the tool on said top surface.

16. The apparatus of claim 15, wherein each said tool tray further comprises:

a pair of strips, each said strip being coupled to one of a pair of opposing edges of said panel, each said strip extending upwardly from said panel toward said associated extension arm; and a pair of hooks, each said hook being coupled to an upper end of an associated one of said pair of strips, each said hook extending upwardly and around said associated extension arm, thereby removably hanging said tool tray to said associated extension arm.

17. The apparatus of claim 16, wherein each said hook is rotatable with respect to said associated strip, each said hook being positionable to extend downwardly from said upper end of said associated strip.

18. The apparatus of claim 1, further comprising:

said post being extendable between a retracted position and an extended position; said post having a height between said top end and said bottom end being less than 3.5 feet when said post is positioned in said retracted position, said height being greater than 7.5 feet when said post is positioned in said extended position, said post comprising a plurality of rods, each said rod except for a bottommost rod of said plurality of rods being telescopically received into an adjacently lower rod of said plurality of rods, each said rod except for said bottommost rod being frictionally retained by said adjacently lower rod with respect to said adjacently lower rod;

a collapsible base being coupled to said bottom end of said post for supporting said post on a support surface, said collapsible base being positioned in a deployed position wherein said collapsible base extends outwardly from said post, said collapsible base being collapsible toward said post, said collapsible base comprising:

a slider being slidably coupled to said post, said slider laterally surrounding said post;

a plurality of legs, each said leg being pivotally coupled to said slider such that each said leg is pivotable toward and away from said post, each said leg extending outwardly from said post and being angled downwardly; and a plurality of links, each said link being pivotally coupled to said post adjacent to said bottom end and to one of said plurality of legs wherein each said leg pivots outwardly away from said post when said slider moves toward said bottom end and toward said post when said slider moves away from said bottom end;

each said extension arm being extendable away from and retractable toward said post, said pair of extension arms being positionable in a shortened position wherein an arm span distance between a distal end of one extension arm with respect to said post and a distal end of another extension arm with respect to said post is less than 3.5 feet, said pair of extension arms being positionable in a lengthened position wherein said arm span distance is greater than 7.5 feet, each said extension arm being detachable from said post, said post having a pair of opposed recesses, each said opposed recess receiving one of said extension arms, each said extension arm comprising:

a first arm segment being coupled to said post;

a second arm segment extending telescopically into said first arm segment; and a securement pin being coupled to said second arm segment, said first arm segment having an outer wall and a plurality of securement holes extending through said outer wall, said plurality of securement holes being arranged along a line extending away from said post toward said distal end of said extension arm, said securement pin being spring-biased to insert through one of said plurality of securement holes, thereby restraining axial movement of said second arm segment with respect to said first arm segment;

each said saddle comprising:

a coating covering said central member and each said prong, said coating being slip resistant;

a pair of tool trays being coupled to and extending downwardly from an associated one of said extension arms, each said tool tray comprising:

a panel;

a platform being coupled to a top side of said panel, said platform having a top surface being slip resistant, said top surface being configured for supporting a tool and frictionally engaging the tool to retain the tool on said top surface;

a pair of strips, each said strip being coupled to one of a pair of opposing edges of said panel, each said strip extending upwardly from said panel toward said associated extension arm; and a pair of hooks, each said hook being coupled to an upper end of an associated one of said pair of strips, each said hook extending upwardly and around said associated extension arm, thereby removably hanging said tool tray to said associated extension arm, each said hook being rotatable with respect to said associated strip, each said hook being positionable to extend downwardly from said upper end of said associated strip.

* * * * *